United States Patent
Lopez

(10) Patent No.: US 7,030,813 B1
(45) Date of Patent: Apr. 18, 2006

(54) ARRAY ANTENNAS WITH INDEPENDENT SUM AND DIFFERENCE EXCITATIONS LEVELS

(75) Inventor: Alfred R. Lopez, Commack, NY (US)

(73) Assignee: BAE SYSTEMS Information and Electronic Systems Integration Inc., Greenlawn, NY (US)

( * ) Notice: Subject to any disclaimer, the term of this patent is extended or adjusted under 35 U.S.C. 154(b) by 0 days.

(21) Appl. No.: 11/013,717

(22) Filed: Dec. 16, 2004

(51) Int. Cl.
*G01S 5/02* (2006.01)

(52) U.S. Cl. ............... 342/427; 342/383; 342/384

(58) Field of Classification Search .......... 342/149, 342/152, 383, 384, 427
See application file for complete search history.

(56) References Cited

U.S. PATENT DOCUMENTS

| | | | | |
|---|---|---|---|---|
| 3,803,624 A | * | 4/1974 | Kinsey | 342/380 |
| 3,943,523 A | * | 3/1976 | Fassett | 342/368 |
| 4,912,477 A | * | 3/1990 | Lory et al. | 342/373 |
| 5,030,960 A | * | 7/1991 | Bartley | 342/427 |
| 5,248,984 A | * | 9/1993 | Sezai | 342/427 |
| 5,506,589 A | * | 4/1996 | Quan et al. | 342/373 |

* cited by examiner

*Primary Examiner*—Dao Phan
(74) *Attorney, Agent, or Firm*—Kenneth P. Robinson

(57) ABSTRACT

Improved punch-through performance is provided for applications such as sum and difference mode processing for IFF and other applications. With an array including a row of elements, difference sidelobe levels are increased relative to sum sidelobe levels by independently controlling relative signal levels of difference mode signals provided from signals received by central elements of the array. By processing signals from central elements independently from processing of signals from outer elements of the array, difference mode signals derived from the central elements may be employed at higher signal levels in order to raise difference mode sidelobe levels to improve punch-through performance. Antenna systems and methods are described.

10 Claims, 3 Drawing Sheets

| ELEMENT NUMBERS | SUM EXCITATION (VOLTAGE RATIO) | DIFFERENCE EXCITATION (VOLTAGE RATIO) |
| --- | --- | --- |
| 1, 36 | 0.2000 | ±0.2000 |
| 2, 35 | 0.2136 | ±0.2136 |
| 3, 34 | 0.2531 | ±0.2531 |
| 4, 33 | 0.3142 | ±0.3142 |
| 5, 32 | 0.3911 | ±0.3911 |
| 6, 31 | 0.4768 | ±0.4768 |
| 7, 30 | 0.5647 | ±0.5647 |
| 8, 29 | 0.6492 | ±0.6492 |
| 9, 28 | 0.7260 | ±0.7260 |
| 10, 27 | 0.7927 | ±0.7927 |
| 11, 26 | 0.8483 | ±0.8483 |
| 12, 25 | 0.8928 | ±0.8928 |
| 13, 24 | 0.9274 | ±0.9274 |
| 14, 23 | 0.9534 | ±0.9534 |
| 15, 22 | 0.9722 | ±0.9722 |
| 16, 21 | 0.9853 | ±0.9853 |
| 17, 20 | 0.9937 | ±0.9937 |
| 18, 19 | 0.9985 | ±2.5000 |

FIG. 2

ARRAY ANTENNAS WITH INDEPENDENT SUM AND DIFFERENCE EXCITATIONS LEVELS

RELATED APPLICATIONS (Not Applicable)

FEDERALLY SPONSORED RESEARCH (Not Applicable)

BACKGROUND OF THE INVENTION

This invention relates to array antennas and, more particularly, to such antennas arranged for operation with sum and difference excitation.

Sum and difference excitation has been provided in monopulse type simultaneous lobing implementations. In such implementations, sum and difference excitation levels have typically been comparable or identical. A result has been that principal sum and difference sidelobe patterns, while differing, have typically been of comparable relative levels or magnitude.

In some usages, such as particular Identification Friend or Foe (IFF) applications, it is desirable that the minimum difference sidelobe level exceed the maximum sum sidelobe level regardless of system implementation variables. Thus, operationally it is desirable that no sum side lobe level exceed a relevant difference side lobe level. The occurrence of a sum sidelobe level exceeding an associated difference sidelobe level in this context may be termed "punch-through." Typical prior implementations employing similar or identical sum and difference excitations have not been entirely satisfactory for such usage. For example, the capability to improve sum mode gain, while maintaining a desired difference-to-sum sidelobe margin, may be limited.

Accordingly, objects of the present invention are to provide new and improved array antennas and such antennas which may have one or more of the following characteristics or capabilities:

operation with sum and difference patterns;
independent sum and difference excitation level capability;
difference excitation adjustment to increase difference sidelobe level;
relative adjustment of sum and difference excitation levels and resulting sidelobe levels;
sum mode gain increasable, while meeting difference-to-sum sidelobe margin objective;
adjustment to cause minimum difference sidelobe level to significantly exceed maximum sum sidelobe level;
improved punch-through performance; and
low-complexity implementation.

SUMMARY OF THE INVENTION

In accordance with the invention, an array antenna system may include:

an array (42) comprising a row of radiating elements including a plurality of left outer elements (44), at least one left central element (46), at least one right central element (48), and a plurality of right outer elements (50);
a first circuit device (52) coupled to the left and right outer elements (44, 50) and arranged to provide at a first sum port (53) an outer sum signal and at a first difference port (54) an outer difference signal;
a second circuit device (56) coupled to the left and right central elements (46, 48) and arranged to provide at a second sum port (57) a central sum signal and at a second difference port (58) a central difference signal;
a first power divider/combiner (60) coupled to the first and second sum ports (53, 57) and configured to provide at a sum signal output port (61) a composite sum signal formed by combining at predetermined relative signal levels the outer sum and central sum signals; and
a second power divider/combiner (62) coupled to the first and second difference ports (54, 58) and configured to provide at a difference signal output port (63) a composite difference signal formed by combining at predetermined relative signal levels the outer difference and central difference signals.

The antenna system may be configured to enable the central difference signal and outer difference signal to be provided at independently predetermined relative signal levels for combining to form the composite difference signal.

Also in accordance with the invention, a method, for use with an array antenna having a row of radiating elements including left outer elements, at least one left central element, at least one right central element and right outer elements, may include the steps of:

(a) receiving signals via the elements;
(b) forming an outer sum signal and an outer difference signal by processing signals received via the left outer elements and right outer elements;
(c) forming a central sum signal and a central difference signal by processing signals received via the at least one left central element and at least one right central element;
(d) combining the outer sum and central sum signals provided in steps (b) and (c) at predetermined relative signal levels to form a composite sum signal; and
(e) combining the outer difference and central difference signals provided in steps (b) and (c) at predetermined relative signal levels to form a composite difference signal.

The method may be arranged to enable the central difference signal and outer difference signal to be provided at independently predetermined relative signal levels for combining to form the composite difference signal.

For a better understanding of the invention, together with other and further objects, reference is made to the accompanying drawings and the scope of the invention will be pointed out in the accompanying claims.

BRIEF DESCRIPTION OF THE DRAWINGS

FIG. 2 is a table showing exemplary sum and difference excitation levels associated with the radiating elements of FIG. 1.

DESCRIPTION OF THE INVENTION

Figure 1:
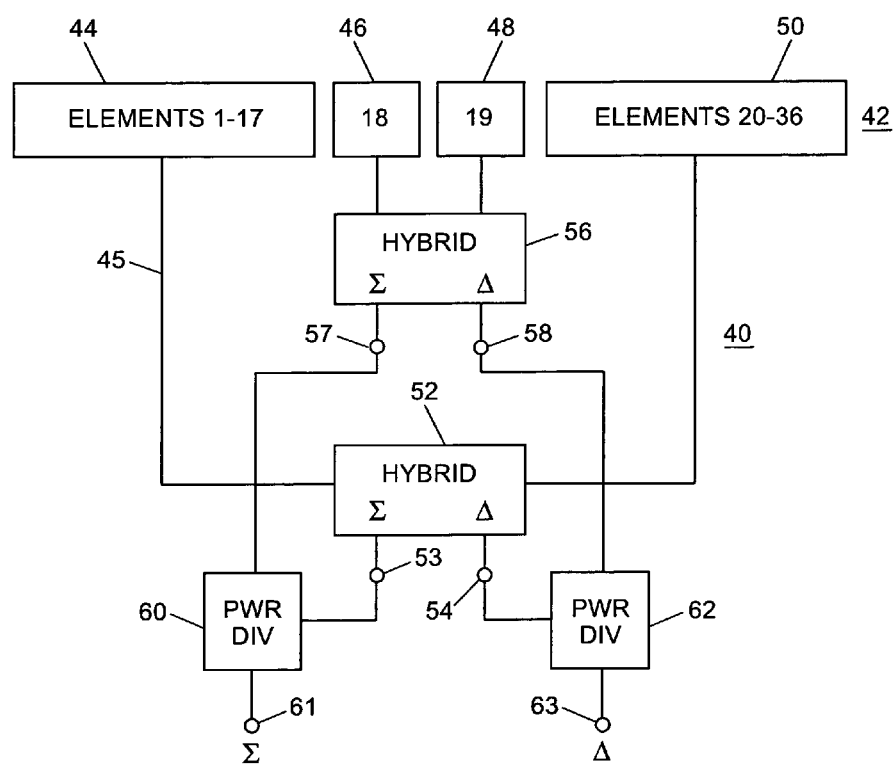
FIG. 1 shows an embodiment of an array antenna system employing a row of thirty-six radiating elements.

As illustrated in FIG. 1, an array antenna system 40 may include an array 42 comprising thirty-six radiating elements arranged in a line or row running left to right as represented in FIG. 1. Thus, the row of radiating elements as illustrated includes a plurality of left outer radiating elements 1–17 represented by block 44, left central element 18 represented by block 46, right central element 19 represented by block 48, and a plurality of right outer elements 20–36 represented by block 50. Any suitable number and type of radiating elements may be utilized and the thirty-six elements of this example may be substantially identical or particular elements may have different characteristics as may be determined by skilled persons in implementations for particular applications.

To provide a composite signal from radiating elements 1–17, via path 45, block 44 may include suitable signal combining/dividing network circuitry, as well as resistive, amplification, phase shift and other devices, as may be determined by skilled persons to provide for combining and processing individual element signals. Thus, relative signal level weighting may be provided for signals from individual elements using known techniques to provide a composite received signal which may be coupled via path 45. Alternatively, path 45 may, for example, comprise a discrete signal path for each radiating element, with further signal processing provided external to block 44. The specific forms and locations of processing may be determined by skilled persons as suitable for particular implementations. Similar arrangements may also be provided with respect to other radiating elements of the array 42.

As shown, the array antenna system of FIG. 1 also includes first and second circuit devices 52 and 56, illustrated as hybrid devices. First circuit device 52 is shown coupled to the left outer elements 1–17, via block 44, and to the right outer elements 20–36, via block 50. First circuit device 52 is arranged to provide an outer sum signal at first sum port 53 and an outer difference signal at first difference port 54. Second circuit device 56 is coupled to the left central element 18, via block 46, and to the right central element 19, via block 48. Second circuit device 56 is arranged to provide a central sum signal at second sum port 57 and a central difference signal at second difference port 58.

First circuit device 52 is thus arranged in known manner to provide a sum signal at first sum port 53 which represents a summation value of signals received via the outer elements 1–17 and 20–36, and a difference signal at first difference port 54 which represents a difference value between signals received via elements 1–17 and signals received via elements 20–36. Reciprocal operation pertains, so that the described arrangement can also be employed for transmission of signals in known manner, as appropriate for monopulse or other operation.

Second circuit device 56 is arranged to operate in the same basic manner as device 52, to provide sum and difference signals at respective second sum and second difference ports 57 and 58 representing sum and difference values derived from signals received via the left and right central radiating elements 18 and 19. Such sum and difference values may be derived by application of known techniques as, for example, used to develop sum and difference signals in IFF monopulse applications. In other embodiments, any appropriate number of radiating elements may be utilized, and the single elements 18 and 19 may each be replaced by two or more central elements, while providing the same type of operation as described (e.g., two left central elements and two right central elements within respective blocks 46 and 48).

The FIG. 1 embodiment includes respective first and second power divider/combiner units 60 and 62. First power divider/combiner 60 is shown coupled to first sum port 53 and second sum port 57, and having a sum signal output port 61. Second power divider/combiner 62 is coupled to first difference port 54 and second difference port 58, and has a difference signal output port 63. Units 60 and 62 may be any appropriate type of device selectable by skilled persons as suitable to combine signals at predetermined relative signal levels to provide a composite output signal and typically to also provide reciprocal operation for signal transmission.

First power divider/combiner 60 is configured to provide, at sum signal output port 61, a composite sum signal formed by combining at predetermined relative signal levels the outer sum and central sum signals available respectively from the first and second sum ports 53 and 57. Second power divider/combiner 62 is configured to provide, at difference signal output port 63, a composite difference signal formed by combining at predetermined relative signal levels the outer difference and central difference signals available respectively from the first and second difference ports 54 and 58. With respect to relative signal levels, as will be further described a feature of the invention is enabling signal levels, of the central difference signal for example, to be independently predetermined. This enables, in the combining of the respective signals, the central difference signal from port 58 to be combined at a higher relative signal level, on a per element basis, than the signal level of the outer difference signal in the forming of the composite difference signal, which is instrumental in providing improved punch-through performance. As described, units 60 and 62 are effective to respectively provide a composite sum signal at sum signal output port 61 and a composite difference signal at difference signal output port 63. These composite sum and difference signals as thus made available may be subjected to further processing using known techniques as may be applicable to IFF and other applications.

Referring now to FIG. 2, there is provided an example of sum and difference excitation levels which may be employed in relation to the thirty-six radiating elements of the FIG. 1 array antenna system. For present purposes, these levels will be considered to be the relative signal levels, on a per element basis, at the combining of signals by units 60 and 62. In FIG. 2, the column to the left references the thirty-six elements, with left outer elements 1–17 shown in descending order and right outer elements 20–36 correlated therewith in ascending order, so that the end elements 1 and 36 are shown on the first line and other correspondingly positioned elements are paired on the following lines of FIG. 2. Left central element 18 and right central element 19 are included on the last line of FIG. 2.

The middle column of FIG. 2 provides an example of predetermined relative signal levels for sum signals, identified as "Sum Excitation (Voltage Ratio)", for the left outer elements 1–17 (provided via block 44 in FIG. 1), for the right outer elements 20–36 (provided via block 50), for the left central element 18 and for the right central element 19 (provided via respective blocks 46 and 48). As shown, these relative signal levels exhibit a weighting or taper which may represent a typical known form of sum mode antenna pattern shaping suitable for a particular application (i.e., excitation of end elements 1 and 36 is shown at the lowest 0.2000 signal level value, excitation of central elements 18 and 19 is shown at the highest 0.9985 signal level value and the intervening elements are shown at signal levels tapered between these values.

The right column of FIG. 2 provides an example of predetermined relative signal levels for difference signals, identified as "Difference Excitation (Voltage Ratio)", for the left outer elements 1–17 (e.g., respective relative signal levels from +0.2000 to +0.9937), for the right outer elements 20–36 (e.g., respective relative signal levels from −0.9937 to −0.2000), for the left central element 18 (e.g., relative signal level of +2.5000) and for the right central element 19 (e.g., relative signal level of −2.5000). In this example, it will be seen that on a per element basis (i.e., signal levels associated with individual radiating elements) elements 18 and 19 (which supply the signals used to provide the central difference signal provided in FIG. 1 by second circuit device 56 at second difference port 58) have higher relative signal levels (e.g., +2.5000 and −2.5000) than the signal levels as shown for elements 1–36 for sum excitation and for elements 1–17 and 20–36 for difference excitation. As a result, with use of the signals levels as shown, when the composite sum and difference signals are formed at the respective sum and difference signal output ports 61 and 63 as previously described, the central difference signal will be combined at a relative signal level which is higher, on a per element basis, than the signal level of each of the central sum, outer difference and outer sum signals as combined in forming the composite sum and difference signals. Thus, the term "on a per element basis" is used not to indicate whether the signal level of the central difference signal itself is higher than that of the central sum, outer difference and outer sum signals, but that the central difference signal is derived from individual radiating element signal levels which are higher (i.e., per element values of 2.5000 as in FIG. 2) than such individual or per element signals employed in deriving others of the central sum, outer difference and outer sum signals (i.e., per element values each less than 1.0 as listed in FIG. 2).

As described, the first and second power divider/combiner units 60 and 62 are configured to provide composite signals by combining specified signals "at predetermined relative signal levels." As discussed with reference to FIG. 2, those specified signals are provided by combining sum and difference signals derived from individual radiating element signals having excitation levels as listed in FIG. 2, for example. It will be understood by skilled persons that with individual signals received by each radiating element, the signal levels of those signals can be adjusted in any suitable manner using known techniques to provide relative signal levels as represented in FIG. 2, for example, with the appropriate signal processing to achieve that result performed at any suitable point or location, or combination of points or locations, within an antenna system (e.g., in FIG. 1, in block 44, unit 52, an intervening unit (not shown), etc., or a combination thereof).

Figure 3:
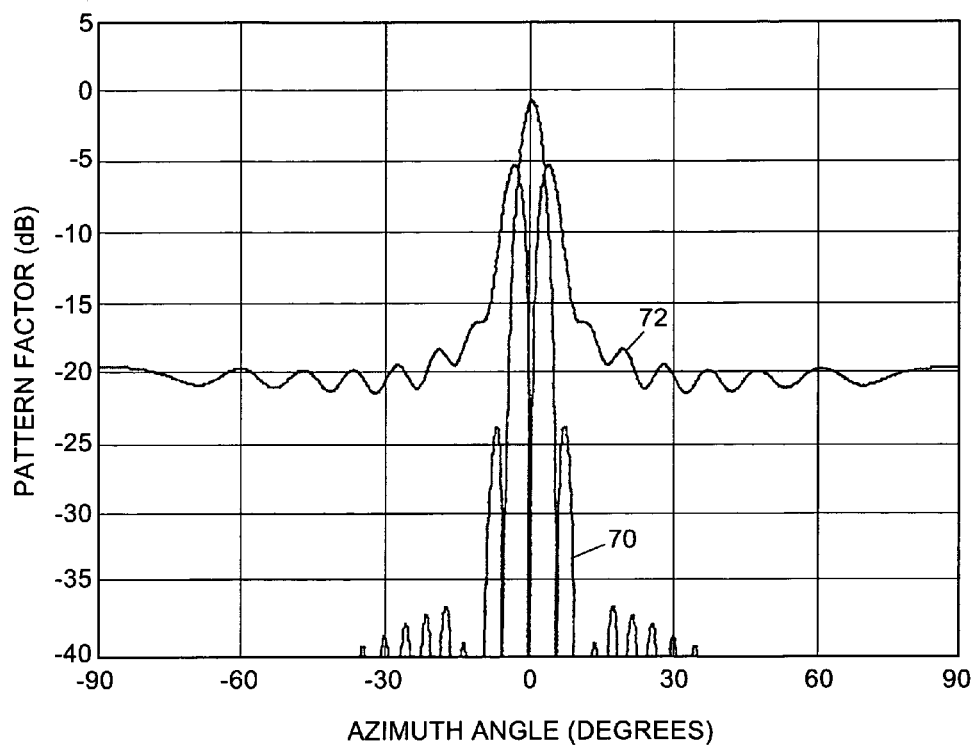
FIG. 3 provides computed sum and difference array factor patterns representing excitation of the FIG. 1 array antenna system consistent with the excitation values shown in FIG. 2.

Results achievable in operation of the FIG. 1 antenna system, with relative signal levels for the radiating elements such as shown in FIG. 2 are represented in FIG. 3. As a result of providing independent control of excitation levels in the sum and difference modes (and particularly by providing a higher relative signal level for central element difference mode excitation) minimum difference mode side lobe levels are caused to significantly exceed maximum sum mode sidelobe levels, with associated provision of excellent punch-through performance. As illustrated by the array factor patterns of FIG. 3, it is highly unlikely that under any expected operating condition any portion of the sum mode sidelobe pattern as represented at 70 will exceed, or punch-through, the difference mode sidelobe pattern as represented at 72. In this way, the invention provides the capability to improve sum mode gain performance, while maintaining a desired difference-to-sum sidelobe margin.

A method usable with an array antenna as shown in FIG. 1, for example, may employ the following steps.

(a) Receiving signals via the radiating elements of array 42.

(b) Forming an outer sum signal and an outer difference signal by processing (e.g., as described above) signals received via the left outer elements 41 and right outer elements 50.

(c) Forming a central sum signal and a central difference signal by processing signals received via the left central element 46 and right central element 48.

(d) Combining the outer sum and central sum signals provided in steps (b) and (c) at predetermined relative signal levels to form a composite sum signal (e.g., as made available at port 61).

(e) Combining the outer difference and central difference signals provided in steps (b) and (c) at predetermined relative signal levels to form a composite difference signal (e.g., as made available at port 63).

With reference to the sum and difference excitation values listed in and discussed with reference to FIG. 2, the method may be arranged to enable the central difference signal and outer difference signal to be provided at independently predetermined relative values for combining to form the composite difference signal. As in the FIG. 2 example, the central difference signal may comprise the +2.5000 signal level shown in the right column for element 18 and the −2.5000 signal level shown for element 19, while outer difference signal may comprise the +0.2000 to +0.9937 signal levels shown for outer elements 1–17, respectively, and the −0.9937 to −0.2000 signal levels shown for outer elements 20–36, respectively. In this manner the central difference signal may be provided at a relative signal level which is higher, on a per element basis, than the signal level of the outer difference signal. The outer and central sum signals in this example may be provided based upon the signal levels shown in the middle column of FIG. 2. Thus, by providing the central difference signal at an independently predetermined signal level (e.g., a higher signal level) the results represented in FIG. 3 may be achieved, whereby the difference mode sidelobe level 72 is caused to substantially exceed the sum mode sidelobe level 70 to provide improved punch-through performance.

While there have been described the currently preferred embodiments of the invention, those skilled in the art will recognize that other and further modifications may be made without departing from the invention and it is intended to claim all modifications and variations as fall within the scope of the invention.

The invention claimed is:

1. A method to prevent punch-through in monopulse signal reception, for use with an array antenna having a row of radiating elements including left outer elements, at least one left central element, at least one right central element and right outer elements, the method comprising the steps of:

(a) receiving signals via said elements;

(b) forming an outer sum signal and an outer difference signal by processing signals received via the left outer elements and right outer elements;

(c) forming a central sum signal and a central difference signal by processing signals received via the at least one left central element and at least one right central element;

(d) combining said outer sum and central sum signals provided in steps (b) and (c) at predetermined relative signal levels to form a composite sum signal;

(e) combining said outer difference and central difference signals provided in steps (b) and (c) at predetermined relative signal levels to form a composite difference signal; and (f) implementing step (e) with the central difference signal combined at a higher signal level which is higher, on a per element basis, than the relative signal level of each of the outer sum, outer difference and central sum signals, thereby providing punch-through avoidance.

2. A method as in claim 1, wherein the method is arranged to combine the central difference signal at a higher signal level sufficiently high, on a per element basis, to prevent punch-through.

3. A method as in claim 1, wherein in step (e) the central difference signal is combined at a higher signal level which is at least two times, on a per element basis, the relative signal level of the outer difference signal.

4. A method as in claim 1, wherein in step (e) the central difference signal is combined at a higher signal level which is at least two times, on a per element basis, the relative signal level of each of the outer sum, outer difference and central sum signals as combined to form said composite sum and difference signals.

5. An array antenna system configured to prevent punch-through in monopulse signal reception, comprising:

an array (42) comprising a row of radiating elements including a plurality of left outer elements (44), at least one left central element (46), at least one right central element (48), and a plurality of right outer elements (50);

a first circuit device (52) coupled to said left and right outer elements (44, 50) and arranged to provide at a first sum port (53) an outer sum signal and at a first difference port (54) an outer difference signal;

a second circuit device (56) coupled to said left and right central elements (46, 48) and arranged to provide at a second sum port (57) a central sum signal and at a second difference port (58) a central difference signal;

a first power divider/combiner (60) coupled to said first and second sum ports (53, 57) and configured to provide at a sum signal output port (61) a composite sum signal formed by combining said outer sum and central sum signals, each combined at a predetermined relative signal level; and a second power divider/combiner (62) coupled to said first and second difference ports (54, 58) and configured to provide at a difference signal output port (63) a composite difference signal formed by combining said outer difference and central difference signals, the outer difference signal combined at a predetermined relative signal level and the central difference signal combined at a higher signal level which is higher, on a per element basis, than said relative signal level of each of the outer sum, outer difference and central sum signals;

said higher signal level of the central difference signal predetermined to provide punch-through avoidance.

6. An array antenna system as in claim 5, wherein the second power divider/combiner is configured to combine said central difference signal at a higher signal level sufficiently high, on a per element basis, to prevent punch-through.

7. An array antenna system as in claim 5, wherein the second power divider/combiner is configured to combine said central difference signal at a higher signal level at least two times, on a per element basis, the relative signal level of each of said outer sum, outer difference and central sum signals.

8. An array antenna system as in claim 5, wherein the at least one left central element and the at least one right central element each consist of a single element.

9. An array antenna system as in claim 8, wherein the plurality of left outer elements and the plurality of right outer elements each consists of 17 elements.

10. An array antenna system as in claim 5, wherein the at least one left central element and the at least one right central element each comprise a plurality of elements.

* * * * *